United States Patent
Take

(10) Patent No.: US 8,089,932 B2
(45) Date of Patent: Jan. 3, 2012

(54) HANDOVER METHOD IN A WIRELESS ACCESS NETWORK

(75) Inventor: Keijiro Take, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 893 days.

(21) Appl. No.: 11/662,194

(22) PCT Filed: Sep. 10, 2004

(86) PCT No.: PCT/JP2004/013243
§ 371 (c)(1), (2), (4) Date: Mar. 8, 2007

(87) PCT Pub. No.: WO2006/027849
PCT Pub. Date: Mar. 16, 2006

(65) Prior Publication Data
US 2008/0064403 A1    Mar. 13, 2008

(51) Int. Cl.
*H04W 4/00* (2009.01)

(52) U.S. Cl. ......................................... 370/331; 455/436

(58) Field of Classification Search .......... 370/310–350; 455/436–466
See application file for complete search history.

(56) References Cited

U.S. PATENT DOCUMENTS

| | | | |
|---|---|---|---|
| 4,881,271 A | 11/1989 | Yamauchi et al. | |
| 5,442,681 A | 8/1995 | Kotzin et al. | |
| 5,506,867 A | 4/1996 | Kotzin et al. | |
| 5,799,252 A * | 8/1998 | Nakagoshi et al. | 455/436 |
| 5,845,192 A * | 12/1998 | Saunders | 370/331 |
| 6,226,518 B1 * | 5/2001 | An | 455/449 |
| 6,507,575 B1 * | 1/2003 | Dajer et al. | 370/337 |
| 6,535,494 B1 | 3/2003 | Kondo et al. | |
| 2002/0089958 A1 * | 7/2002 | Feder et al. | 370/338 |

FOREIGN PATENT DOCUMENTS

| | | |
|---|---|---|
| EP | 0 899 899 A2 | 3/1999 |
| GB | 2 298 997 A | 9/1996 |
| JP | 63-232533 A | 9/1988 |
| JP | 5-161176 A | 6/1993 |
| JP | 6-502980 A | 3/1994 |
| JP | 8-242489 A | 9/1996 |
| JP | 09-307943 A | 11/1997 |
| JP | 10-271553 A | 10/1998 |
| JP | 11-262043 A | 9/1999 |
| JP | 2000-092563 A | 3/2000 |
| WO | WO-99/45728 A2 | 9/1999 |
| WO | WO 9945728 A2 * | 9/1999 |

OTHER PUBLICATIONS

3GPP TR 25.931 V5.1.0 (Jun. 2002) Release 5 p. 46-70.

* cited by examiner

*Primary Examiner* — Kent Chang
*Assistant Examiner* — Kashif Siddiqui
(74) *Attorney, Agent, or Firm* — Birch Stewart Kolasch & Birch, LLP

(57) ABSTRACT

When a mobile device performs a handover from a first wireless base station to a second wireless base station, a base station controller sends a control message addressed to the second base station to notify the handover, to the first wireless base station via a wired line. The first wireless base station sends received control message to the second wireless base station using a pre-established wireless line. The wireless base stations exchange a control message to control the second wireless base station, a control message to control the mobile device, and user data of the mobile device and a communication partner, using the wireless line.

12 Claims, 14 Drawing Sheets

HANDOVER METHOD IN A WIRELESS ACCESS NETWORK

TECHNICAL FIELD

The present invention relates to a handover method in a wireless access network, and more particularly, to a handover method in a wireless access network that includes wireless links between wireless base stations.

BACKGROUND ART

In a mobile communication system, a handover is performed when a mobile device moves from a communication area of a certain wireless base station in which the mobile device is currently in communication to a communication area of another wireless base station. Various handover technologies have been proposed.

For example, Non-patent Document 1 discloses a technology related to a handover method in which a base station controller controls each wireless base station without direct transmission of signaling information or user data between wireless base stations in a mobile communication system that connects a plurality of wireless base stations to which a mobile device is connected to the base station controller with wired lines.

Specifically, the mobile device measures communication quality of a wireless line connected to a wireless base station that the mobile device is not currently communicating with. If the measured communication quality is higher than that of a wireless line connected to the wireless base station that the mobile device is currently communicating with, the mobile device sends the measured result to the base station controller.

The base station controller establishes a wired link between the wireless base station with the good result and the base station controller, and instructs the wireless base station to which the wired link has been established (a destination wireless base station) to establish a wireless link to the mobile device. After the destination wireless base station completes establishment of the wired link to the base station controller and preparation for establishment of the wireless link to the mobile device, the base station controller instructs the mobile device to establish the wireless link to the destination wireless base station via the wireless base station that the mobile device is currently communicating with.

After switching (handing over) the wireless line from the wireless base station that the mobile device is currently communicating with to the destination wireless base station, the mobile device notifies the base station controller via the destination wireless base station that the handover has been completed.

However, the handover method described in the Non-patent Document 1 involves a problem that the handover takes a long time due to a heavy processing load on the base station controller at the time of the handover because a wired line between the destination wireless base station and the base station controller is switched every time a handover of a mobile device occurs.

To solve the problem, according to the conventional technology described in Patent Document 1, a single master base station connected to public switched telephone networks (PSTN) and a plurality of slave base stations are serially connected with wired lines, and the master wireless base station comprehensively controls the slave wireless base stations. In this manner, the master wireless base station establishes the wired links among the wireless base stations and manages a location of the mobile device so that the handover is performed at a high speed.

Patent Document 1: Japanese Patent Laid-open No. H10-271553

Non-patent Document 1: 3GPP TR25.931 V5.1.0 (2002-06)

DISCLOSURE OF INVENTION

Problem to be Solved by the Invention

However, the conventional technology described in the Patent Document 1 involves a problem that locations of the wireless base stations are restricted because the master base station and the slave base stations are connected with wired lines.

The present invention was made to solve the problems described above. It is an object of the present invention to obtain a handover method in a wireless access network, which reduces the processing load on the base station controller without restricting the locations of the wireless base stations.

Means for Solving Problem

A handover method according to one aspect of the present invention is for a wireless access network that includes a base station controller, at least one first wireless base station connected to the base station controller with a wired line, and at least one second wireless base station not connected to the base station with the wired line, where a mobile device is connected to the base station controller via the first wireless base station or the second wireless base station. The handover method includes establishing a wireless line between the first wireless base station and the second wireless base station in advance; sending including, when the mobile device performs a handover from the first wireless base station to the second wireless base station, the base station controller sending a control message addressed to the second base station to notify that the mobile device performs the handover, to the first wireless base station via the wired line; sending including the first wireless base station sending the control message addressed to the second wireless base station received from the base station controller to the second wireless base station using established wireless line; and exchanging including the first wireless base station and the second wireless base station exchanging a control message for the base station controller to control the second wireless base station, a control message for the base station controller to control the mobile device, and user data of the mobile device and a communication partner, using the wireless line.

Effect of the Invention

According to an aspect of the present invention, a wireless line is established in advance between a first wireless base station connected to a base station controller with a wired line and a second wireless base station connected to the base station controller not with the wired line, a message for the base station controller to control the second wireless base station, a control message for the base station controller to control the mobile device, and user data of the mobile device and a counterpart thereof are transmitted via the first wireless base station when the mobile device is handed over from the first wireless base station to the second wireless base station, and the wireless line established in advance is used between the first wireless base station and the second wireless base station. As a result, a handover is performed with a wireless base station that includes only the wireless interface having no restriction on the location thereof without increasing processing load on the base station controller.

EXPLANATIONS OF LETTERS OR NUMERALS

Figure 1:
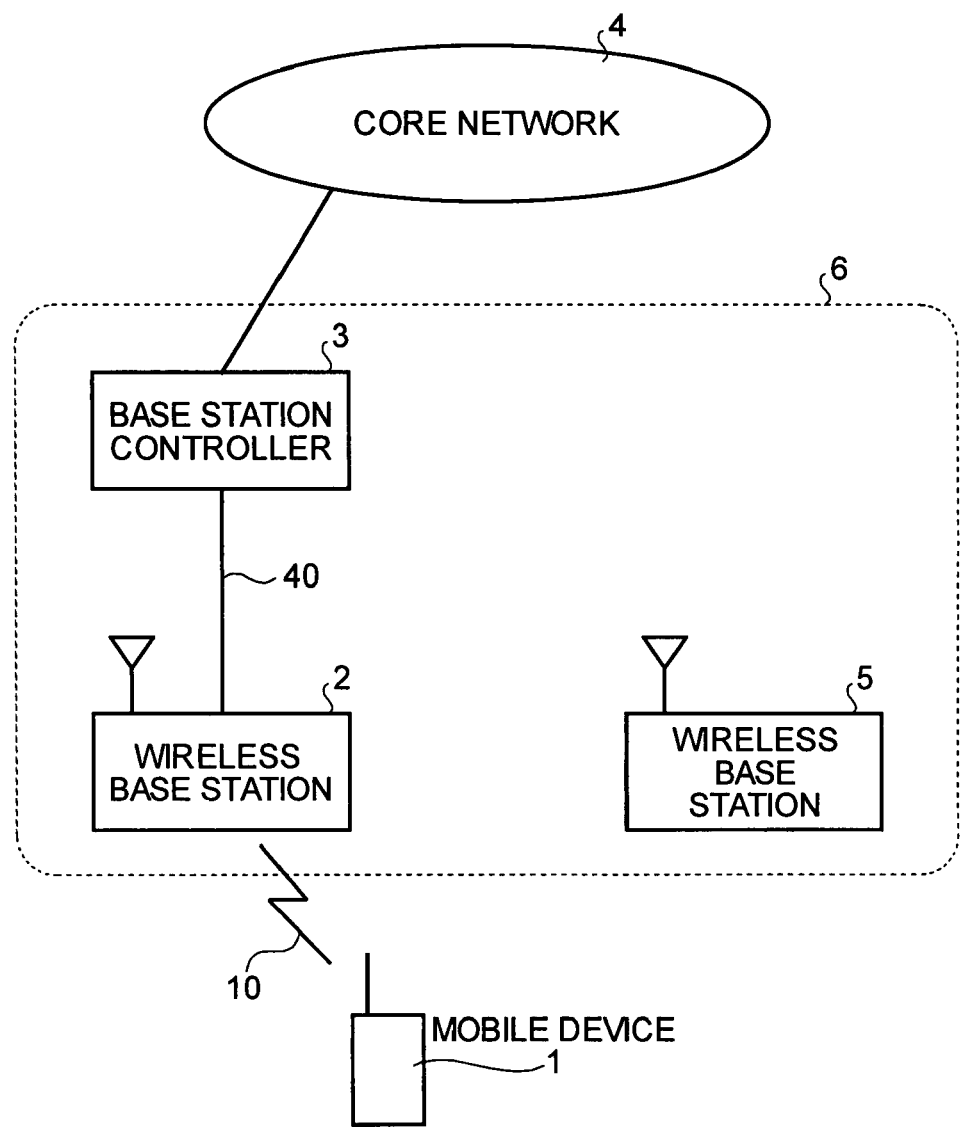
FIG. 1 is an example of a configuration of a mobile communication system that uses a handover method in a wireless access network according to a first embodiment of the present invention (first embodiment)

1 Mobile device
2, 5 Wireless base station
4 Core network
3 Base station controller
6 Wireless access network
7, 8 Cell
10, 11, 12, 13, 14, 15, 16 Wireless line
20, 21, 22 Control signal path
30 User data path
40 Wired line

BEST MODE(S) FOR CARRYING OUT THE INVENTION

Exemplary embodiments of a handover method in a wireless access network according to the present invention are explained below in detail with reference to the accompanying drawings. The present invention is not limited to the embodiments explained below.

First Embodiment

A first embodiment of the present invention is explained referring to FIGS. 1 to 8. FIG. 1 is an example of a configuration of a mobile communication system that uses a handover method in a wireless access network according to the first embodiment. The mobile communication system that uses the handover method in a wireless access network according to the first embodiment includes a wireless access network 6 that includes wireless base stations 2 and 5 and a base station controller 3 that controls the wireless base stations 2 and 5, a core network 4 that is connected to the wireless access network 6 by the base station controller 3, and a mobile device 1 that communicates with a fixed terminal (not shown) or another mobile device (not shown) via the core network 4 connected to the wireless base stations 2 and 5 with wireless lines to set communication paths to the base station controller 3, the fixed terminal, and the other mobile device.

The wireless base station 2 includes a wireless interface and a wired interface. It is connected to the base station controller 3 with a wired line 40, and connected to the mobile device 1 and the adjacent wireless base station 5 with wireless lines. The wireless base station 5 includes a wireless interface alone. It is not connected to the base station controller 3, and it is connected to the mobile device 1 and the adjacent wireless base station 2 with the wireless lines. The base station controller 3 controls the wireless base station 2, and controls the wireless base station 5 via the wireless base station 2. While the wireless access network 6 includes a single base station controller 3 in FIG. 1, there is actually a plurality of the base station controllers 3. Moreover, a plurality of the wireless base stations 2 can be connected to the base station controller 3. Furthermore, a plurality of the wireless base stations 5 can be connected to the wireless base station 2 via the wireless line.

Figure 2:
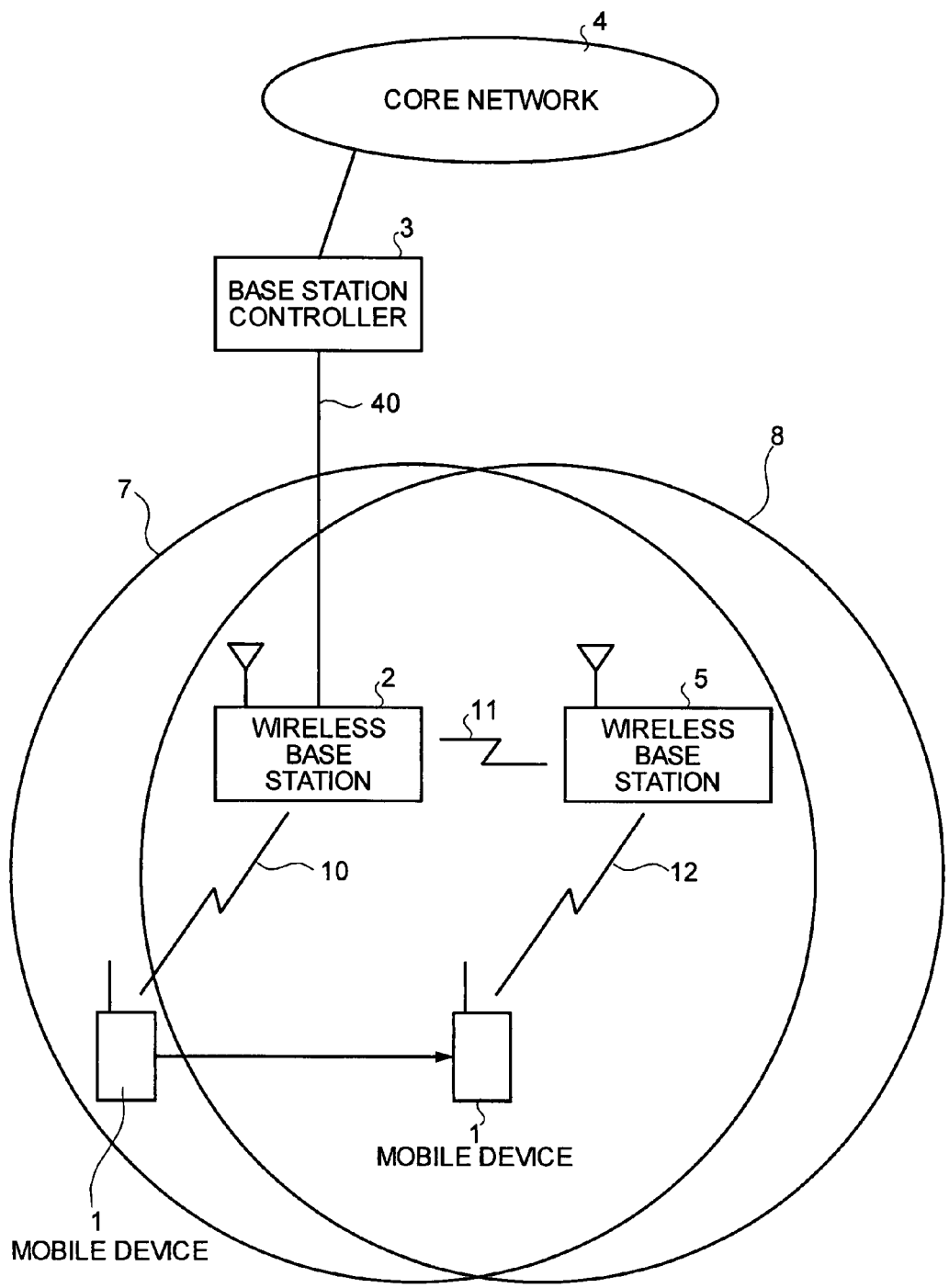
FIG. 2 is a schematic of a configuration of the mobile communication system when a mobile device moves between cells of wireless base stations (first embodiment)

FIG. 2 is a schematic of a configuration of the mobile communication system when the mobile device 1 located in a cell 7, which is a communication area of the wireless base station 2, moves to a location in both of the cell 7 and a cell 8, which is a communication area of the wireless base station 5. When the mobile device 1 is located in the cell 7 (before moving), a wireless line 10 is established between the mobile device 1 and the wireless base station 2. After the mobile device 1 moves to the location in both of the cells 7 and 8 and it is handed over from the wireless base station 2 to the wireless base station 5 (after moving), a wireless line 12 is established between the mobile device 1 and the wireless base station 5. A wireless line 11 is established in advance between the wireless base station 2 and the wireless base station 5. The wireless line 11 is always present between the wireless base station 2 and the wireless base station 5 regardless of presence of the mobile device 1, and enables communication between the wireless base station 5 and the base station controller 3 via the wireless base station 2.

Figure 3:
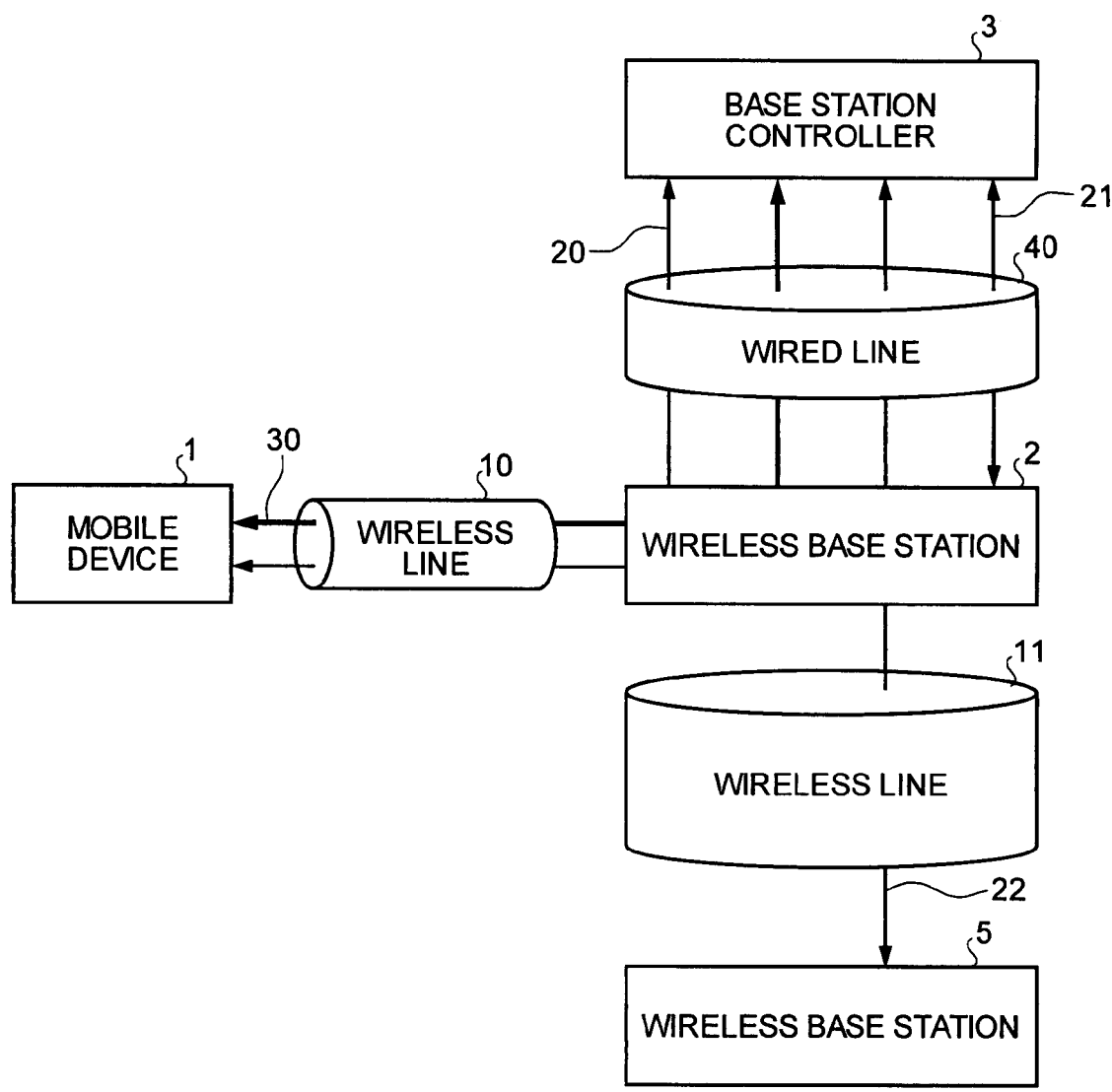
FIG. 3 is an example of a state of signal paths when the mobile device is connected to a wireless base station directly connected to a base station controller for communication (first embodiment)

FIG. 3 is a schematic of a state of signal paths when the mobile device 1 is connected to the wireless base station 2 for communication. A control signal path 21 is used for sending and receiving a control message by which the base station controller 3 controls the wireless base station 2, and it uses the wired line 40.

A control signal path 22 is used for sending and receiving a control message by which the base station controller 3 controls the wireless base station 5. The control signal path 22 uses the wired line 40 between the base station controller 3 and the wireless base station 2, and uses the wireless line 11 between the wireless base station 2 and the wireless base station 5.

A control signal path 20 is used for sending and receiving a control message by which the base station controller 3 controls the mobile device 1. The control signal path 20 uses the wired line 40 between the base station controller 3 and the wireless base station 2, and uses the wireless line 10 between the wireless base station 2 and the mobile device 1.

A user data path 30 is used for sending and receiving user data related to communication between the mobile device 1 and another mobile device or a fixed terminal. The user data path 30 uses the wired line 40 between the base station controller 3 and the wireless base station 2, and uses the wireless line 10 between the wireless base station 2 and the mobile device 1.

Figure 4:
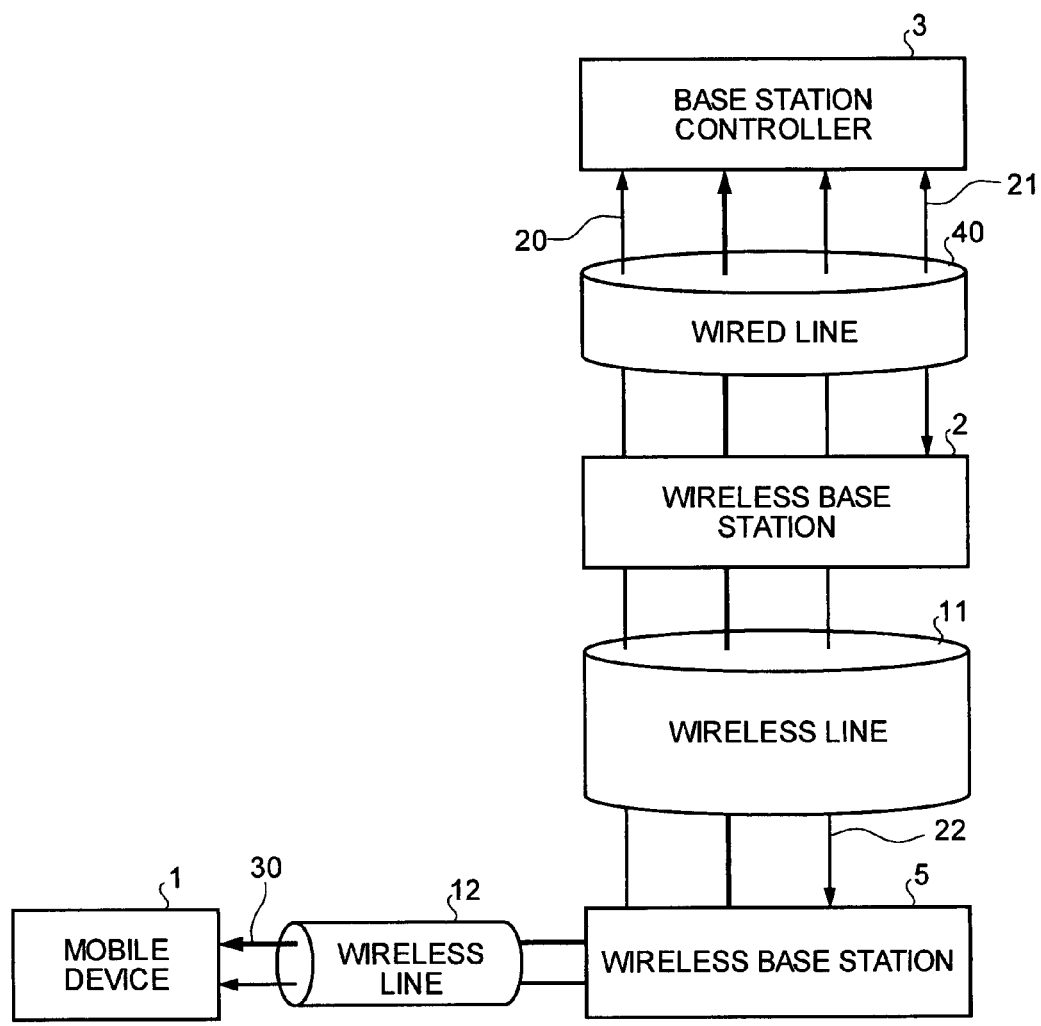
FIG. 4 is an example of a state of the signal paths when the mobile device is connected to a wireless base station connected to the base station controller via a wireless base station for communication (first embodiment)

FIG. 4 is a schematic of a state of the signal paths when the mobile device 1 is connected to the wireless base station 5 for communication. The difference between the states of the communication paths when the mobile device 1 is connected to the wireless base station 5 for communication and when the mobile device 1 is connected to the wireless base station 2 for communication as shown in FIG. 3 is that, because the mobile device 1 is connected to the wireless base station 5 instead of the wireless base station 2, the wireless line 10 connected to the wireless base station 2 is open, whereby the control signal path 20 and the user data path 30 use the wireless line 12 between the mobile device 1 and the wireless base station 5 and they use the wireless line 11 between the wireless base station 5 and the wireless base station 2.

Figure 5:
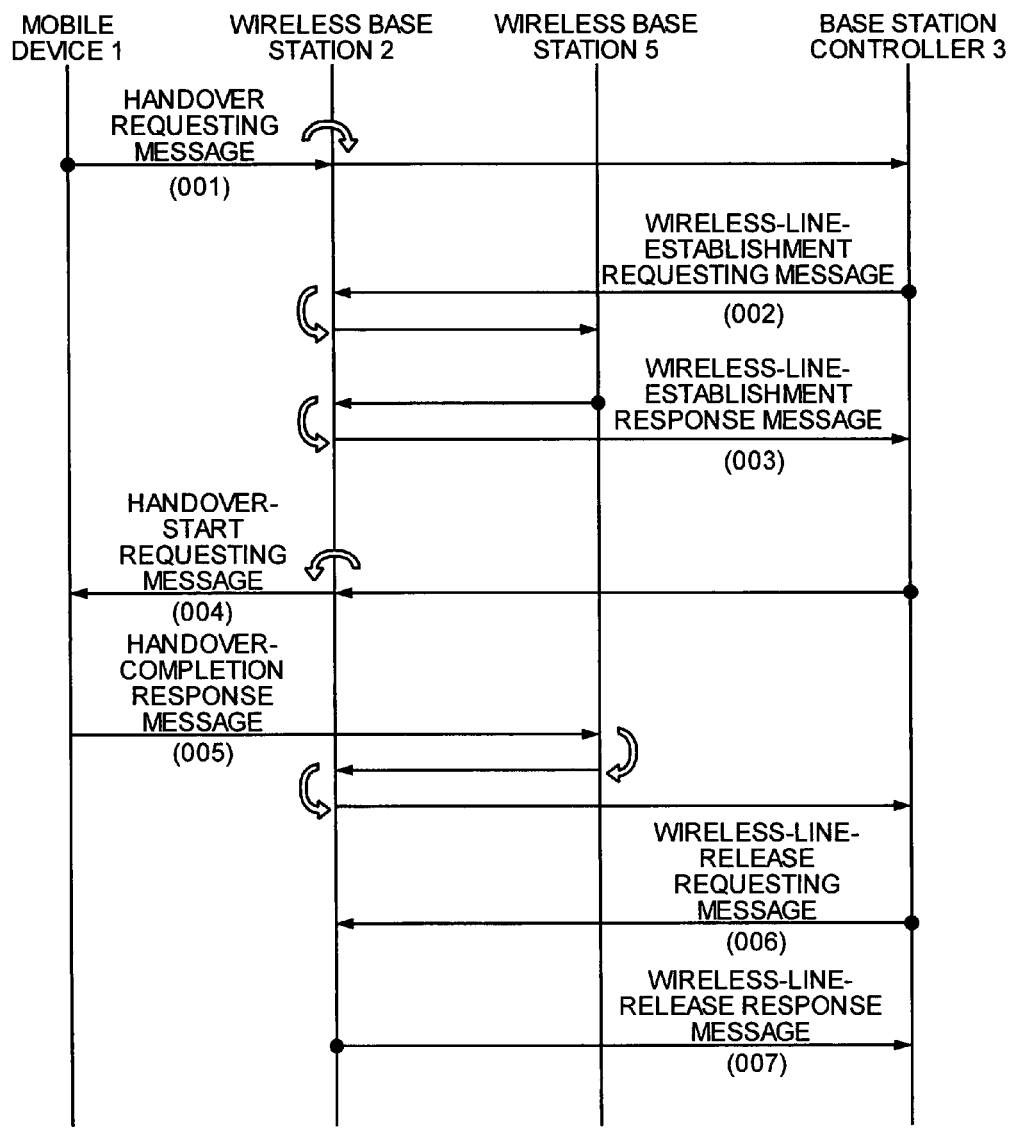
FIG. 5 is a sequence diagram for explaining an operation of a handover in the mobile communication system according to the first embodiment of the present invention (first embodiment)
Figure 6:
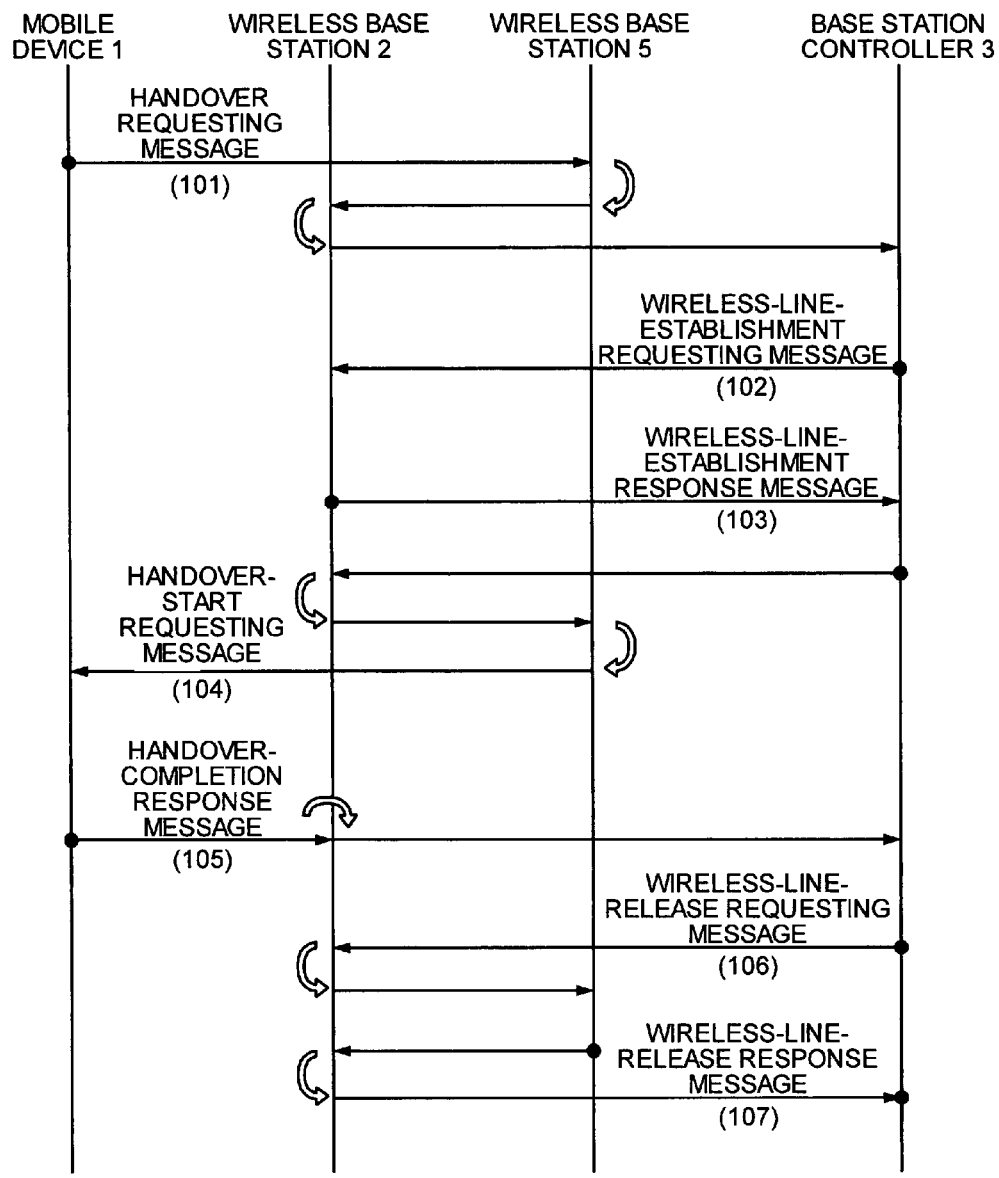
FIG. 6 is a sequence diagram for explaining an operation of a handover in the mobile communication system according to the first embodiment of the present invention (first embodiment)

An operation of the mobile communication system according to the first embodiment is explained referring to sequence diagrams shown in FIGS. 5 and 6. Firstly, referring to the sequence diagram in FIG. 5, the operation of the mobile communication system when the mobile device 1 that is communicating with the wireless base station 2 under the state of the signal paths shown in FIG. 3 is handed over to the wireless base station 5 to be under the state of the signal paths shown in FIG. 4 is explained.

The mobile device 1 measures communication quality of the wireless line 10 and that of a wireless line connected to a wireless base station except the wireless base station 2 (in this case, the wireless line 12 connected to the wireless base station 5). To measure the communication quality, for example, a signal to noise ratio (SNR) or an error rate can be used.

If the communication quality of the wireless line 12 is higher that of the wireless line 10, the mobile device 1 uses the control signal path 20 to send a handover requesting message to request a handover from the wireless base station 2 to the wireless base station 5 to the base station controller 3 via the wireless base station 2 (001).

The base station controller 3 recognizes from the handover requesting message that a destination is the wireless base station 5, and uses the control signal path 22 to send a wireless-line-establishment requesting message to request an establishment of the wireless line 12 between the wireless base station 5 and the mobile device 1 to the wireless base station 5 via the wireless base station 2 (002). When the wireless base station 2 sends the message to the wireless base station 5 or the base station controller 3 using the control signal path 22, the wireless base station 2 analyzes contents of the message to be sent. By analyzing the wireless-line-establishment requesting message to the wireless base station 5, the wireless base station 2 recognizes that the wireless line 12 will be established, i.e., the mobile device 1 will be handed over to the wireless base station 5. The wireless base station 2 performs a process for setting the control signal path 20 and the user data path 30 connected to the mobile device 1 to the wireless line 11 between the wireless base station 2 and the wireless base station 5.

The wireless base station 5 performs a process for establishing the wireless line 12 between the wireless base station 5 and the mobile device 1 based on the wireless-line-establishment requesting message. Specifically, the wireless base station 5 performs a process for using the wireless line 12 such as startup of hardware and software related to the wireless line 12. The wireless base station 5 sets the control signal path 20 and the user data path 30 to the wireless line 11. The control signal path 20 and the user data path 30 are thereby set from the wireless base station 2 to the wireless base station 5 using the wireless line 11. Because the wireless line 10 between the wireless base station 2 and the mobile device 1 remains established, the control signal path 20 and the user data path 30 are connected also to the mobile device 1 using the wireless line 10.

When the process for establishing the wireless line 12 is completed, the wireless base station 5 uses the control signal path 22 to send a wireless-line-establishment response message indicative of completion of the process for establishing the wireless line 12 to the base station controller 3 via the wireless base station 2 (003).

The base station controller 3 uses the control signal path 20 to send a handover-start requesting message that permits a handover to the wireless base station 5 to the mobile device 1 via the wireless base station 2 (004).

Upon receiving the handover-start requesting message, the mobile device 1 starts transition from the wireless line 10 connected to the wireless base station 2 to the wireless line 12 connected to the wireless base station 5. When the transition to the wireless line 12 is completed (when the wireless line 12 is established), the mobile device 1 uses the control signal path 20 that uses the wireless lines 12 and 11 to send a handover-completion response message indicative of establishment of the wireless line 12 to the base station controller 3 via the wireless base station 5 and the wireless base station 2 (005).

Upon receiving the handover-completion response message, the base station controller 3 uses the control signal path 21 to send a wireless-line-release requesting message to request release of the wireless line 10 to the wireless base station 2 (006).

Upon receiving the wireless-line-release requesting message, the wireless base station 2 releases resources of the wireless line 10 used to communicate with the mobile device 1. The wireless base station 2 uses the control signal path 21 to send a wireless-line-release response message indicative of release of the wireless line 10 to the base station controller 3 (007).

In this manner, the wireless line 12 is established between the mobile device 1 and the wireless base station 5 as shown in FIG. 4. The control signal path 20 and the user data path 30 are set to use the wireless line 12 between the mobile device 1 and the wireless base station 5, to use the wireless line 11 between the wireless base station 5 and the wireless base station 2, and to use the wired line between the wireless base station 2 and the base station controller 3. Thus, the handover from the wireless base station 2 to the wireless base station 5 is completed.

Secondly, referring to the sequence diagram shown in FIG. 6, the operation of the mobile communication system is explained assuming that the mobile device 1 that is communicating with the wireless base station 5 under the state of the signal paths shown in FIG. 4 is handed over to the wireless base station 2 to be under the state of the signal paths shown in FIG. 3.

The mobile device 1 measures communication quality of the wireless line 12 and that of the wireless line connected to a wireless base station except the wireless base station 5 (in this case, the wireless line 10 connected to the wireless base station 2). If the communication quality of the wireless line 10 is higher than the communication quality of the wireless line 12, the mobile device 1 uses the control signal path 20 to send a handover requesting message to request a handover from the wireless base station 5 to the wireless base station 2 to the base station controller 3 via the wireless base station 2 (101).

The base station controller 3 recognizes from the handover requesting message that a destination is the wireless base station 2, and uses the control signal path 21 to send a wireless-line-establishment requesting message to request an establishment of the wireless line 10 between the wireless base station 2 and the mobile device 1 to the wireless base station 2 (102).

After performing the process for establishing the wireless line 10 between the wireless base station 2 and the mobile device 1 based on the wireless-line-establishment request message, the wireless base station 2 uses the control signal path 21 to send a wireless-line-establishment response message indicative of completion of the process for establishing the wireless line 10 to the base station controller 3 (103).

The base station controller 3 uses the control signal path 20 to send a handover-start requesting message that permits a handover to the mobile device 1 via the wireless base station 5 and the wireless base station 2 (104).

Upon receiving the handover-start requesting message, the mobile device 1 starts transition from the wireless line 12 connected to the wireless base station 5 to the wireless line 10 connected to the wireless base station 2. After the transition to the wireless line 10 is completed (the wireless line 10 is established), the mobile device 1 uses the control signal path 20 that uses the wireless line 10 to send a handover-completion response message indicative of establishment of the wireless line 10 to the base station controller 3 via the wireless base station 2 (105).

Upon receiving the handover-completion response message, the base station controller 3 uses the control signal path 22 to send a wireless-line-release requesting message to request release of the wireless line 12 to the wireless base station 5 via the wireless base station 2 (106).

Upon receiving the wireless-line-release requesting message, the wireless base station 5 releases resources of the wireless line 12 used to communicate with the mobile device 1. The wireless base station 5 uses the control signal path 22 to send a wireless-line-release response message indicative of release of the wireless line 12 to the base station controller 3 via the wireless base station 5(107).

On the other hand, the wireless base station 2 recognizes from the wireless-line-release response message sent through the control signal path 22 that the mobile device 1 will be handed over from the wireless base station 5 to the wireless base station 2 and that the wireless line 12 will be released. The wireless base station 2 resets the setting of the control signal path 20 and the user data path 30 set to the wireless line 11 so that the control signal path 20 and the user data path 30 use only the wireless line 10.

In this manner, the wireless line 10 is established between the mobile device 1 and the wireless base station 2 as shown in FIG. 3. The control signal path 20 and the user data path 30 use the wired line 40 between the base station controller 3 and the wireless base station 2, and use the wireless line 10 between the wireless base station 2 and the mobile device 1. The wireless line 12 is released, and the control signal path 20 and the user data path 30 on the wireless line 11 are released. Thus, the handover from the wireless base station 5 to the wireless base station 2 is completed.

An operation of retransmission control particular to wireless lines is explained below. The retransmission control is often performed because the communication quality changes in a wireless line due to a multipath effect such as reflection, transmission, and diffraction. In general, the retransmission control is performed on both ends of the wireless line. In the case of the mobile communication system shown in FIG. 2, the retransmission control is performed between the mobile device 1 and the wireless base station 2 that use the wireless line 10, between the wireless base station 2 and the wireless base station 5 that use the wireless line 11, or between the mobile device 1 and the wireless base station 5 that use the wireless line 12.

However, when the mobile device 1 is handed over, for example, to employ the retransmission control of the wireless line 10 that was performed between the wireless base station 2 connected before the handover and the mobile device 1 between the mobile device 1 and the wireless base station 5 or between the wireless base station 2 and the wireless base station 5, information related to the retransmission such as the information that does not include a sequence number or a delivery confirmation needs to be transferred from one of the wireless base station 2 and the mobile device 1 to the wireless base station 5. In such a case, the wireless base station 2 retains the retransmission control that was performed during the communication with the mobile device 1 using the wireless line 10 even if the mobile device 1 is handed over to the wireless base station 5. At the same time, the wireless base station 5 manages no retransmission control of the communication between the mobile device 1 and the wireless base station 2, sends data from the mobile device 1 to the wireless base station 2, and sends other data from the wireless base station 2 to the mobile device 1. Thus, the wireless base station 5 realizes the retransmission control of two-hop wireless line between the wireless base station 2 and the mobile device 1 as it was realized on the wireless lines 11 and 12, whereby performing the retransmission control as before the handover. However, to the signals from the base station controller 3 to the wireless base station 5, the retransmission control is applied between the wireless base station 2 and the wireless base station 5.

The retransmission control can be realized between the base station controller 3 and the mobile device 1, or it can be realized between the base station controller 3 and the wireless base station 5.

The wireless base station 2 can send information related to power control between the wireless base station 2 and the mobile device 1 to the base station controller 3 and the base station controller 3 can send an instruction related to the power control based on the information related to the power control between the wireless base station 2 and the mobile device 1 to the wireless base station 5 so that the transmission power is stabilized early. Moreover, massages can be sent from the wireless base station 2 to the wireless base station 5 using the wireless line 11.

By controlling electric power with respect to each wireless line as described above, quality of the wireless line can be retained and appropriate retransmission control can be performed.

As explained above, according to the first embodiment, the wireless line 11 is established in advance between the wireless base station 2 connected to the base station controller 3 with the wired line 40 and the wireless base station 5 connected to the base station controller 3 not with the wired line 40, the control message for the base station controller 3 to control the wireless base station 5 (the wireless-line-establishment requesting message and the wireless-line-establishment response message) is transmitted via the wireless base station 2 connected with the wired line 40 when the mobile device 1 is handed over from the wireless base station 2 to the wireless base station 5, and, between the wireless base station 2 and the wireless base station 5, the wireless line 11 is used to send and receive the control message for the base station controller 3 to control the wireless base station 5, the control message for the base station controller 3 to control the mobile device 1 (the handover-start requesting message, the handover-completion response message, and the handover requesting message), and the user data of the mobile device 1 and a counterpart. As a result, the processing load on the base station controller is reduced, and the handover can be performed with the wireless base station 5 that includes only the wireless interface having no restriction on the location thereof.

While the control signal path 21 for the base station controller 3 to control the wireless base station 2 and the control signal path 22 for the base station controller 3 to control the wireless base station 5 via the wireless base station 2 are set to the wired line 40 between the base station controller 3 and the wireless base station 2 according to the first embodiment, the message to control the wireless base station 5 can be sent to the wireless base station 2 using the control signal path 21. In other words, the wired line 40 can use the control signal path 21 that is a logical channel for the wireless base station 2 instead of using the control signal path 22 that is a logical channel dedicated to the base station controller 3 and the wireless base station 5. When the control signal path 21 is used, the wireless base station 2 determines whether the message from the control signal path 21 is addressed to the wireless base station 2 or the wireless base station 5, and, if the message is addressed to the wireless base station 5, the wireless base station 2 sends it to the wireless base station 5 using the control signal path 22 set to the wireless line 11.

While the mobile device 1 starts the handover based on the handover requesting message according to the first embodiment, the mobile device 1 can send the measured result of the line quality of the wireless lines 10 and 12 to the base station controller 3, and the base station controller 3 can start the handover based on the measured result. In such a case, the mobile device 1 sends a line-quality measured-result message that includes the measured result of the line quality instead of the handover requesting message to the base station controller 3, and, if the base station controller 3 determines to perform the handover, the wireless-line-establishment requesting message is sent to start the handover.

Figure 7:
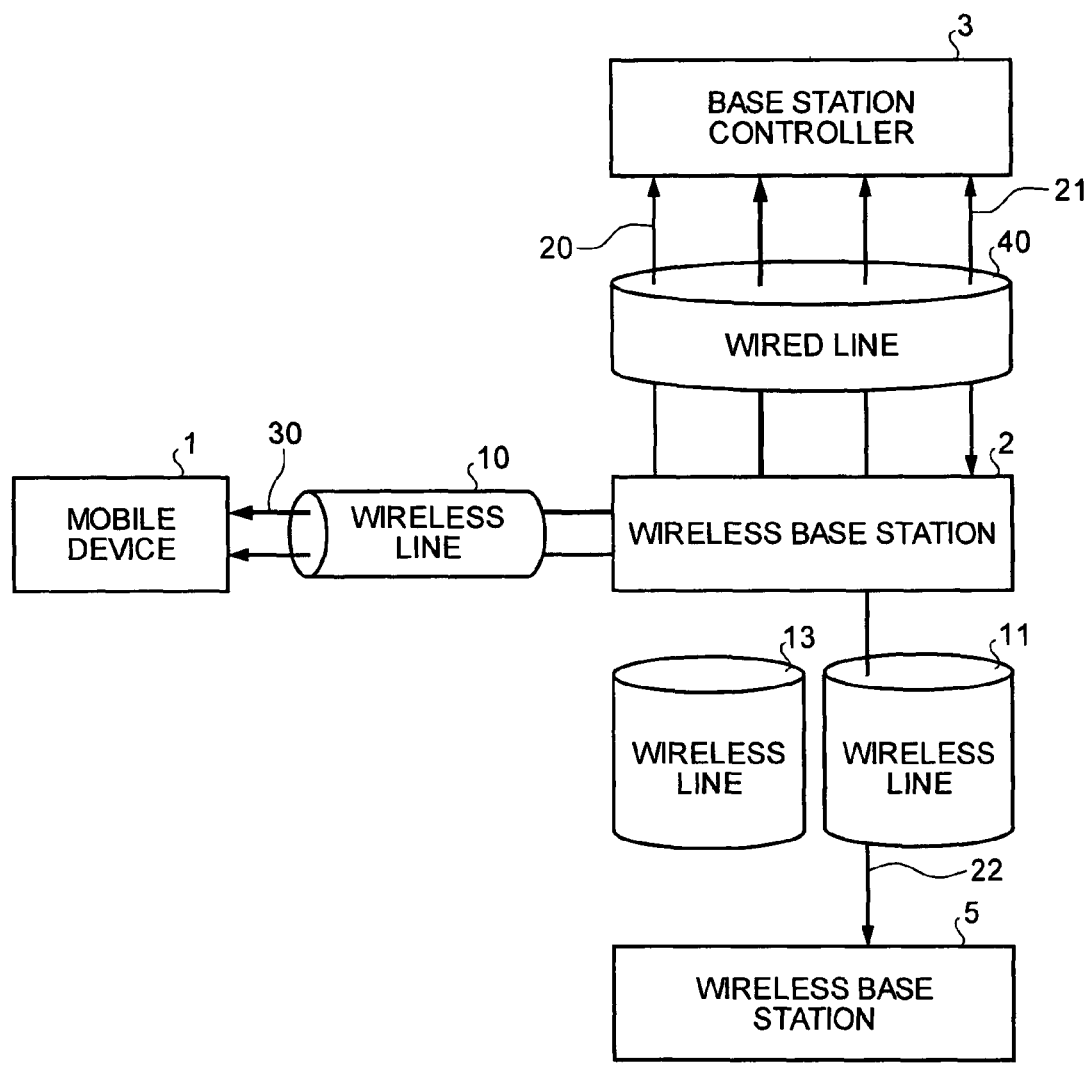
FIG. 7 is an example of a state of the signal paths when the mobile device is connected to the wireless base station directly connected to the base station controller for communication (first embodiment)
Figure 8:
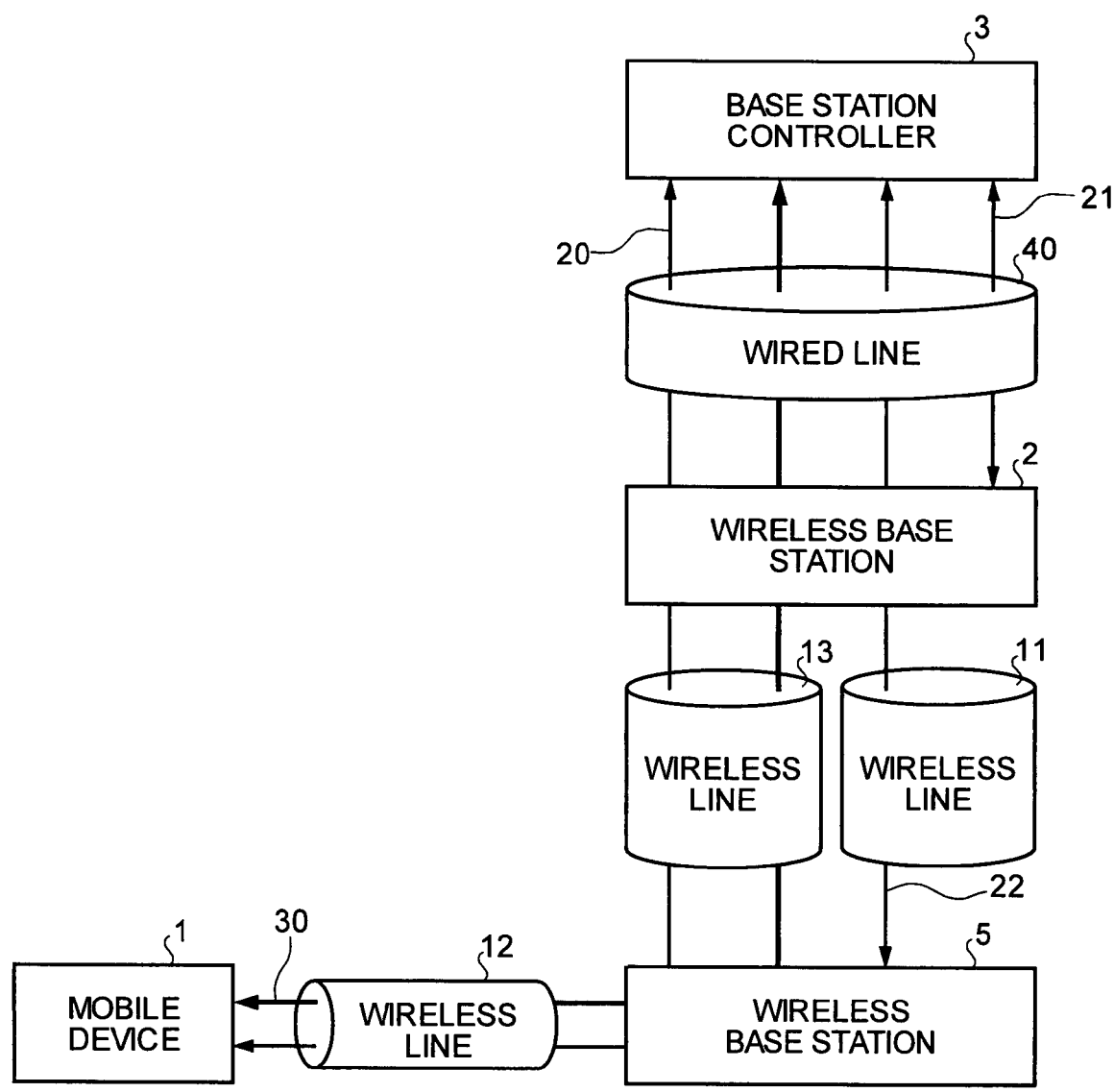
FIG. 8 is an example of a state of the signal paths when the mobile device is connected to the wireless base station connected to the base station controller via the wireless base station for communication (first embodiment)

While the wireless line 11 is established in advance between the wireless base station 2 and the wireless base station 5 and the control signal path 20 and the user data path 30 are set to the wireless line 11 when the mobile device 1 is handed over to the wireless base station 5 according to the first embodiment, the wireless line 11 used for the control signal path 22 and a wireless line 13 used for the control signal path 20 and the user data path 30 connected to the mobile device 1 can be established between the wireless base station 2 and the wireless base station 5 in advance, as shown in FIG. 7. In such a case, if the mobile device 1 is handed over to the wireless base station 5, the control signal path 20 and the user data path 30 can be set to the wireless line 13 as shown in FIG. 8. In other words, different wireless lines are used for the communication between the base station controller 3 and the mobile device 1 and the communication between the base station controller 3 and the wireless base station 5. In this manner, the communication quality of the control signal path 22 between the base station controller 3 and the wireless base station 5 can be retained without being affected by the user traffic between the base station controller 3 and the mobile device 1.

Second Embodiment

A second embodiment of the present invention is explained referring to FIGS. 9 to 12. The mobile communication system that uses the handover method according to the second embodiment is same or similar to the mobile communication system shown in FIG. 1, and the explanation thereof is omitted here.

Figure 9:
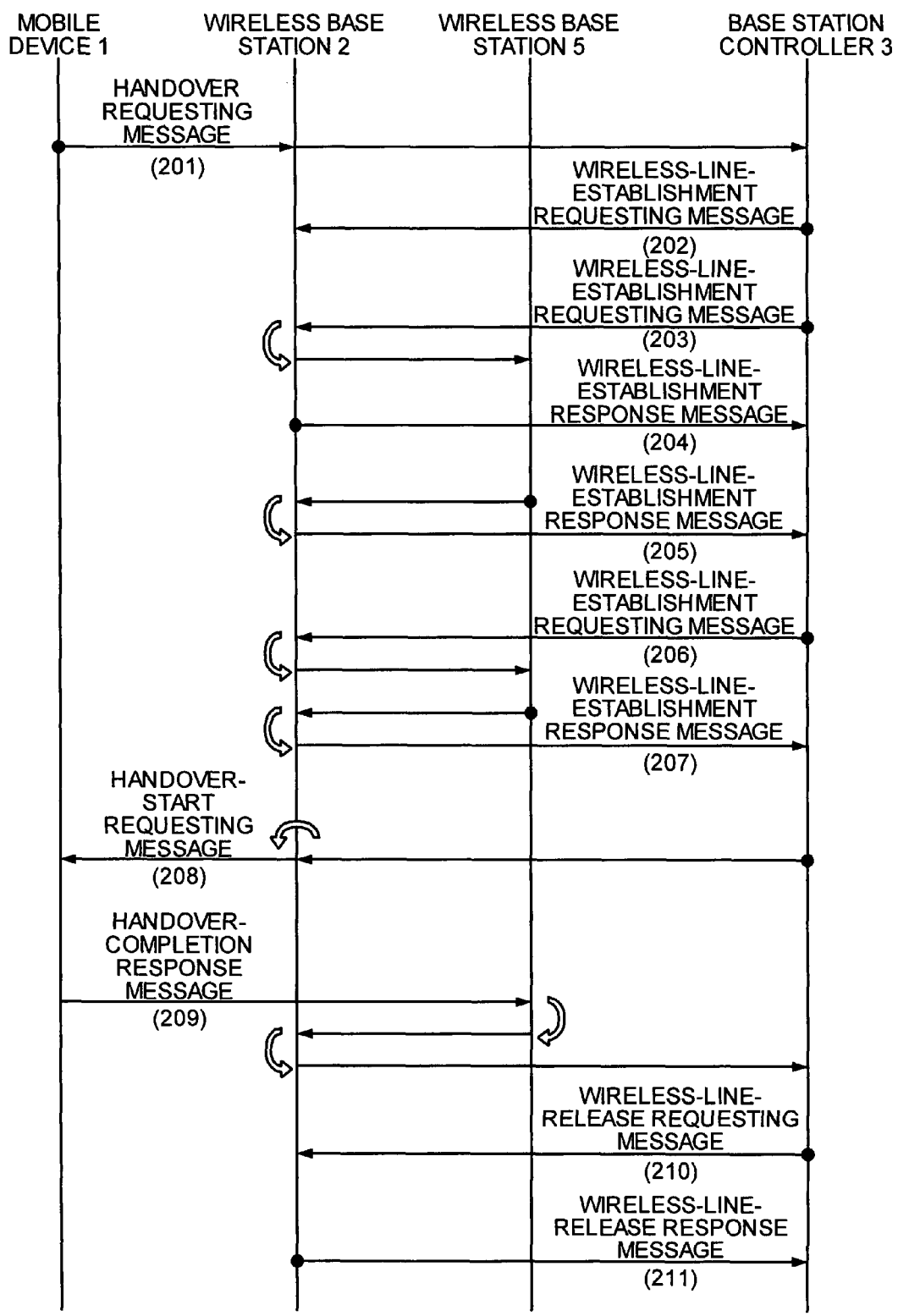
FIG. 9 is a sequence diagram for explaining an operation of a handover in a mobile communication system according to a second embodiment of the present invention (second embodiment)
Figure 10:
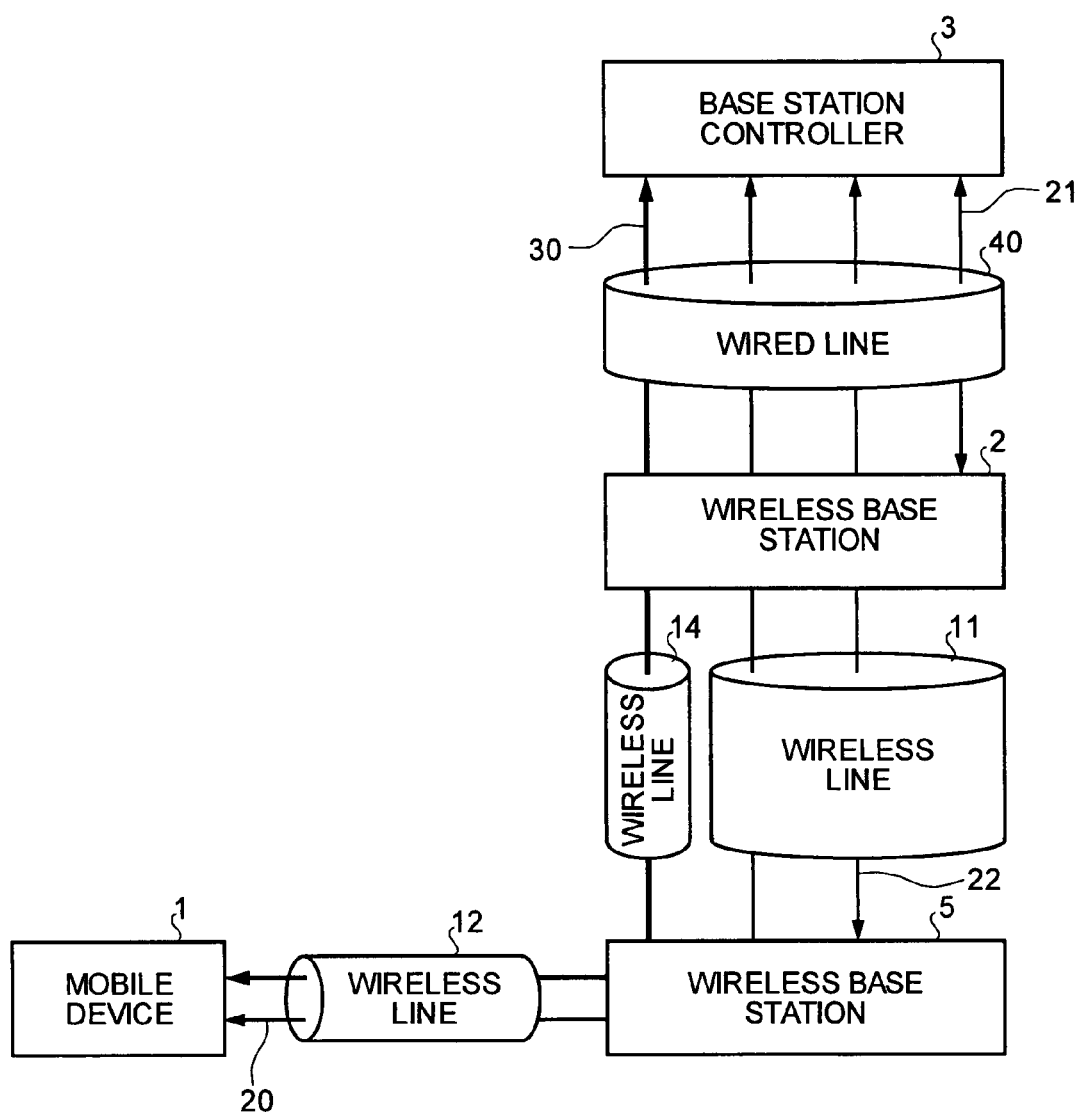
FIG. 10 is an example of a state of signal paths when a mobile device is connected to a wireless base station connected to a base station controller via a wireless base station for communication (second embodiment)

Referring to a sequence diagram shown in FIG. 9 and a schematic of a state of signal paths when the mobile device 1 is connected to the wireless base station 5 for communication shown in FIG. 10, an operation of the mobile communication system according to the second embodiment is explained based on an example of the state of the signal paths shown in FIG. 10 when the mobile device 1, which is currently connected to the wireless base station 2 for communication under the state of the signal paths as shown in FIG. 3, is handed over to the wireless base station 5.

The mobile device 1 measures the communication quality of the wireless line 10 and that of the wireless line connected to a wireless base station except the wireless base station 2 (in this case, the wireless line 12 connected to the wireless base station 5). If the communication quality of the wireless line 12 is higher than that of the wireless line 10, the mobile device 1 uses the control signal path 20 to send a handover requesting message to request a handover from the wireless base station 2 to the wireless base station 5 to the base station controller 3 via the wireless base station 2 (201).

The base station controller 3 recognizes from the handover requesting message that a destination is the wireless base station 5, and uses the control signal path 21 to send a wireless-line-establishment requesting message to request an establishment of a wireless line 14 between the wireless base station 2 and the wireless base station 5 to be used for the user data path 30 connected to the mobile device 1 to the wireless base station 2 (202).

The base station controller 3 uses the control signal path 22 to send a wireless-line-establishment requesting message to request the establishment of the wireless line 14 to the wireless base station 5 via the wireless base station 2 (203).

Upon receiving the wireless-line-establishment requesting message, the wireless base stations 2 and 5 establish the wireless line 14. After the wireless line 14 is established, the wireless base stations 2 and 5 uses the control signal paths 21 and 22 to send a wireless-line-establishment response message indicative of establishment of the wireless line 14 to the base station controller 3 (204, 205).

Upon receiving the wireless-line-establishment response message from the wireless base stations 2 and 5, the base station controller 3 uses the control signal path 22 to send a wireless-line-establishment requesting message to request the establishment of the wireless line 12 connected to the mobile device 1 to the wireless base station 5 via the wireless base station 2 (206).

After the process for establishing the wireless line 12 connected to the mobile device 1 is completed based on the wireless-line-establishment requesting message, the wireless base station 5 uses the control signal path 22 to send a wireless-line-establishment response message indicative of completion of the process for establishing the wireless line 12 to the base station controller 3 via the wireless base station 2 (207).

The base station controller 3 uses the control signal path 20 to send a handover-start requesting message that permits a handover to the mobile device 1 via the wireless base station 2 (208).

Upon receiving the handover-start requesting message, the mobile device 1 starts transition from the wireless line 10 connected to the wireless base station 2 to the wireless line 12 connected to the wireless base station 5. After the transition to the wireless line 12 is completed (after the wireless line 12 is established), the mobile device 1 uses the control signal path 20 to send a handover-completion response message indicative of establishment of the wireless line 12 to the base station controller 3 via the wireless base station 5 and the wireless base station 2 (209). At this time, the wireless base station 5 uses the wireless line 11 to which the control signal path 20 is set to send the handover-completion response message received from the mobile device 1 to the wireless base station 5, and the wireless base station 2 uses the wired line 40 to send the handover-completion response message. Because the user data of the mobile device 1 and the counterpart is sent and received through the user data path 30, the wired line 40 is used between the base station controller 3 and the wireless base station 2, the wireless line 14 is used between the wireless base station 2 and the wireless base station 5, and the wireless line 12 is used between the wireless base station 5 and the mobile device 1.

Upon receiving the handover-completion response message, the base station controller 3 uses the control signal path 21 to send a wireless-line-release requesting message to request release of the wireless line 10 to the wireless base station 2 (210).

Upon receiving the wireless-line-release requesting message, the wireless base station 2 releases resources of the wireless line 10 used to communicate with the mobile device 1. The wireless base station 2 uses the control signal path 21 to send a wireless-line-release response message indicative of release of the wireless line 10 to the base station controller 3 (211).

In this manner, the wireless line 12 is established between the mobile device 1 and the wireless base station 5, and the wireless line 14 is established between the wireless base station 2 and the wireless base station 5, as shown in FIG. 10. The control signal path 20 is set to use the wired line 40 between the base station controller 3 and the wireless base station 2, the wireless line 11 between the wireless base station 2 and the wireless base station 5, and the wireless line 12 between the wireless base station 5 and the mobile device 1. The user data path 30 is set to use the wired line 40 between the base station controller 3 and the wireless base station 2, the wireless line 14 between the wireless base station 2 and the wireless base station 5, and the wireless line 12 between the wireless base station 5 and the mobile device 1. The control signal path 20 and the user data path 30 on the wireless line 10 are released, and the handover from the wireless base station 2 to the wireless base station 5 is completed.

As explained above, according to the second embodiment, the wireless line 11 is established in advance between the wireless base station 2 connected to the base station controller 3 with the wired line 40 and the wireless base station 5 connected to the base station controller 3 not with the wired line 40, and the wireless line 14 is established between the wireless base station 2 and the wireless base station 5 when the mobile device 1 is handed over from the wireless base station 2 to the wireless base station 5. Between the wireless base station 2 and the wireless base station 5, the control message for the base station controller 3 to control the wireless base station 5 and the control message for the base station controller 3 to control the mobile device 1 are transmitted using the wireless line 11, and the user data of the mobile device 1 and the counterpart is transmitted using the wireless line 14. As a result, the processing load on the base station controller 3 is reduced, and the handover can be performed with the wireless base station 5 that includes only the wireless interface having no restriction on the location thereof.

Moreover, between the wireless base station 2 and the wireless base station 5, the wireless line used to transmit the control message for the base station controller 3 to control the wireless base station 5 and the control message for the base station controller 3 to control the mobile device 1 is separate from the wireless line used to transmit the user data of the mobile device 1 and the counterpart. As a result, the quality of the wireless line used to transmit the control messages can be higher than that of the wireless line used to transmit the user data, whereby preventing occurrence of the retransmission control of a control message.

While the wireless-line-establishment requesting message to request the establishment of the wireless line 14 between the wireless base station 2 and the wireless base station 5 is sent to the wireless base station 2 before it is sent to the wireless base station 5 according to the second embodiment, the wireless-line-establishment requesting message can be sent to the wireless base station 5 before it is sent to the wireless base station 2.

While the base station controller 3 sends the wireless-line-establishment requesting message to request an establishment of the wireless line 12 between the wireless base station 5 and the mobile device 1 and the wireless-line-establishment requesting message to request an establishment of the wireless line 14 between the wireless base station 5 and the wireless base station 2 separately to the wireless base station 5 according to the second embodiment, the request for the establishment of the wireless line 12 and the request for the establishment of the wireless line 14 can be included in a single wireless-line-establishment requesting message. In such a case, the wireless base station 5 can send the wireless-line-establishment requesting message to the base station controller 3 after the wireless lines 12 and 14 are established.

Figure 11:
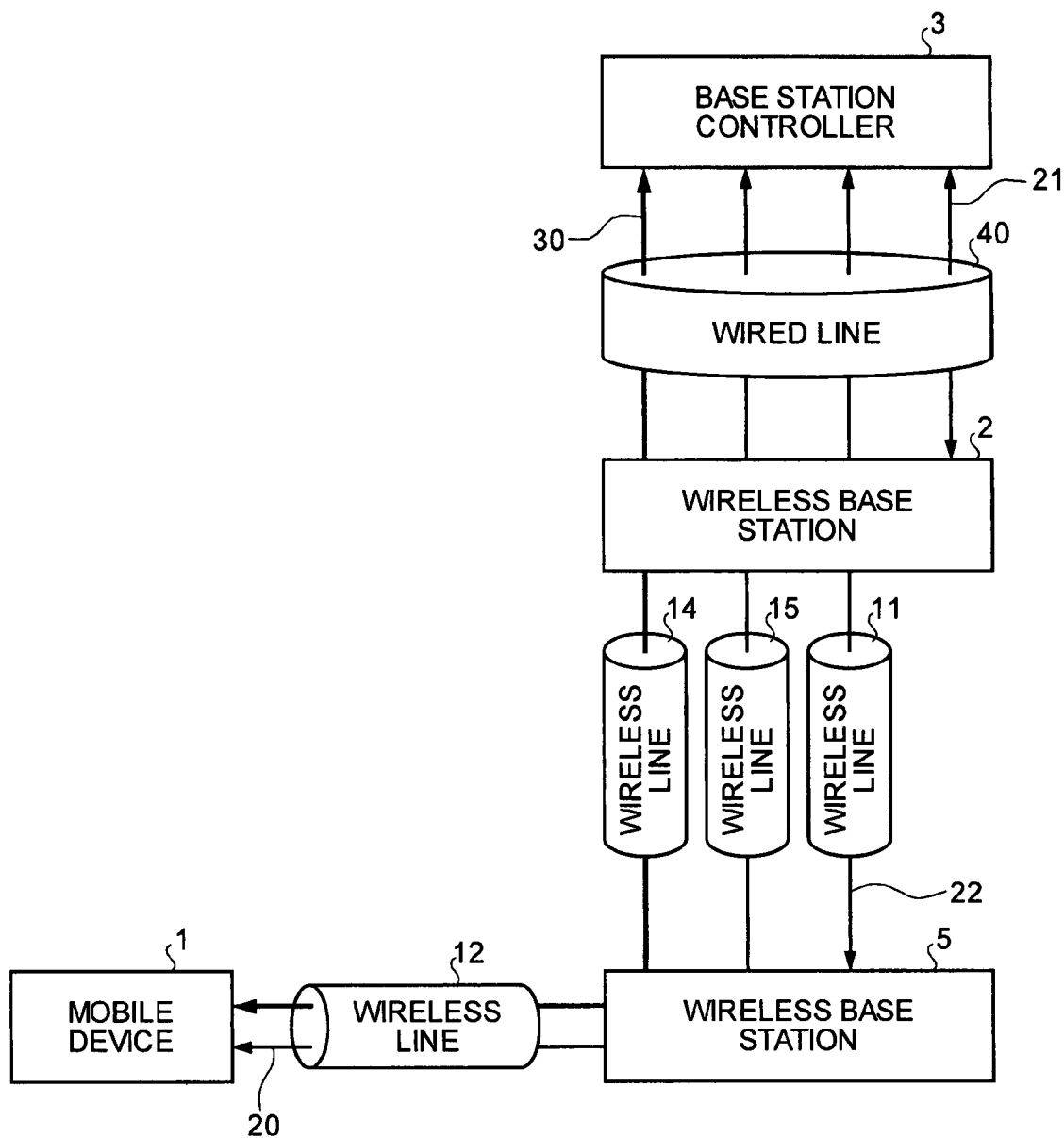
FIG. 11 is an example of a state of signal paths when the mobile device is connected to a wireless base station connected to the base station controller via a wireless base station for communication (second embodiment)

While the control signal path 20 between the base station controller 3 and the mobile device 1 uses the wireless line 11 between the wireless base station 2 and the wireless base station 5 where the control signal path 22 between the base station controller 3 and the wireless base station is set according to the second embodiment, a wireless line 15 can be established between the wireless base station 2 and the wireless base station 5 to be used for the control signal path 20, as shown in FIG. 11. The wireless line 15 can be established by the base station controller 3 sending a wireless-line-establishment requesting message to establish the wireless line 14 that includes a request for the establishment of the wireless line 15 to the wireless base station 2 and the wireless base station 5. Naturally, the wireless lines 14 and 15 can be established by sending the wireless-line-establishment requesting message to request the establishment of the wireless line 14 and the wireless-line-establishment requesting message to request the establishment of the wireless line 15 separately.

Because the control signal path 22 connected to the wireless base station 5 and the control signal path 20 connected to the mobile device 1 use different wireless lines 11 and 15 between the wireless base station 2 and the wireless base station 5, use of resource of the wireless line 11 used for the wireless base station 5 can be reduced.

Moreover, because the control signal path 22 connected to the wireless base station 5 and the control signal path 20 connected to the mobile device 1 use different wireless lines 11 and 15 between the wireless base station 2 and the wireless base station 5, the communication quality of the wireless line 11 used for the control signal path 22 is higher than that of the wireless line 15 used for the control signal path 20, and the wireless base station 5 is controlled with high quality by preventing occurrence of the retransmission control of the control message for the base station controller 3 to control the wireless base station 5 using the control signal path 22.

Figure 12:
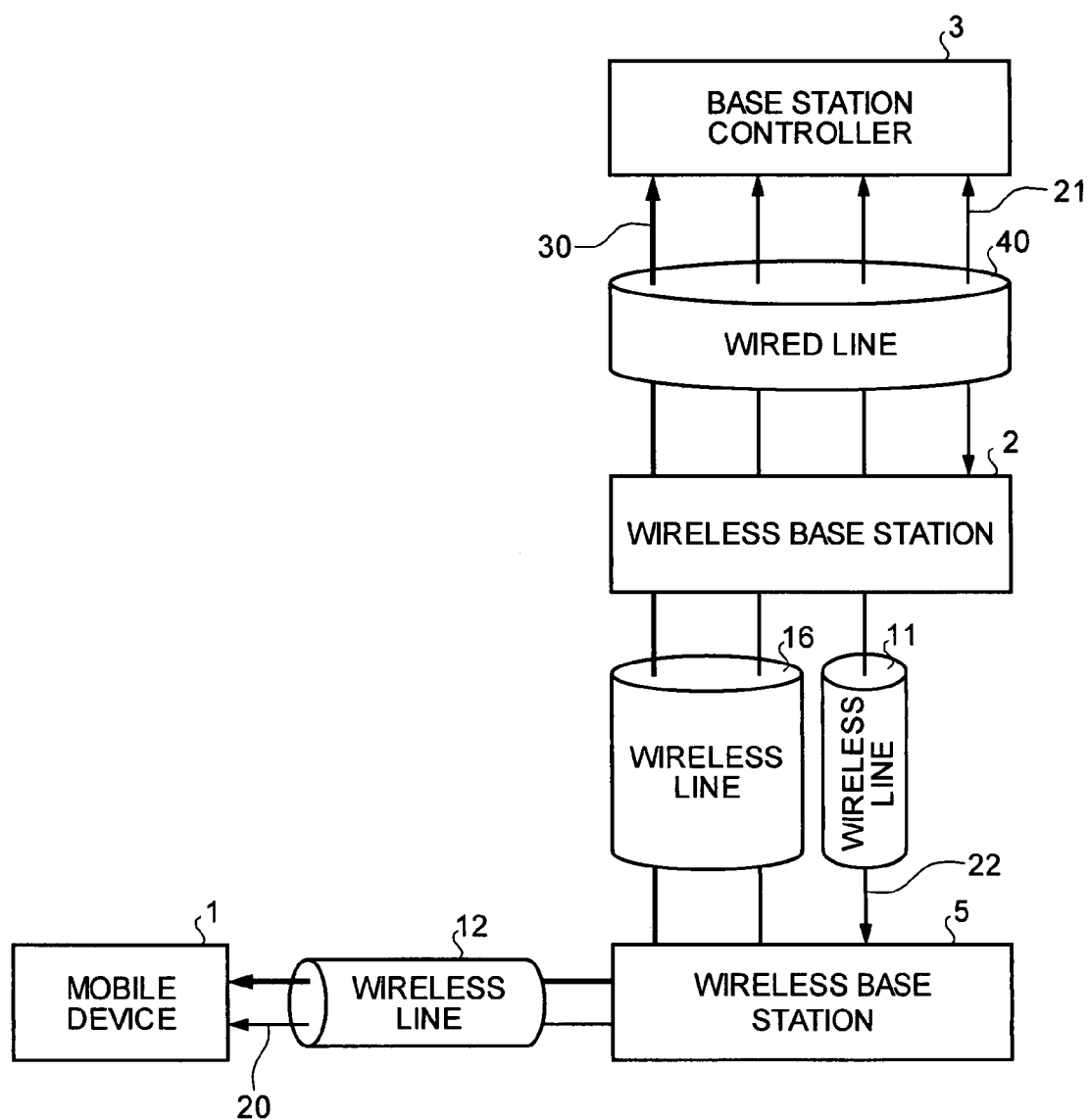
FIG. 12 is an example of a state of signal paths when the mobile device is connected to a wireless base station connected to the base station controller via a wireless base station for communication (second embodiment)

Furthermore, as shown in FIG. 12, a wireless line 16 can be established between the wireless base station 2 and the wireless base station 5 to set the control signal path 20 and the user data path 30. By setting the control signal path 20 and the user data path 30 for the mobile device 1 to the wireless line 16 between the wireless base station 2 and the wireless base station 5, the establishment of the wireless line 16 for the mobile device 1 between the wireless base station 2 and the wireless base station 5 is limited to the times of the handover or call setup of the mobile device 1. As a result, the wireless lines between the wireless base station 2 and the wireless base station 5 are effectively used.

Third Embodiment

Figure 13:
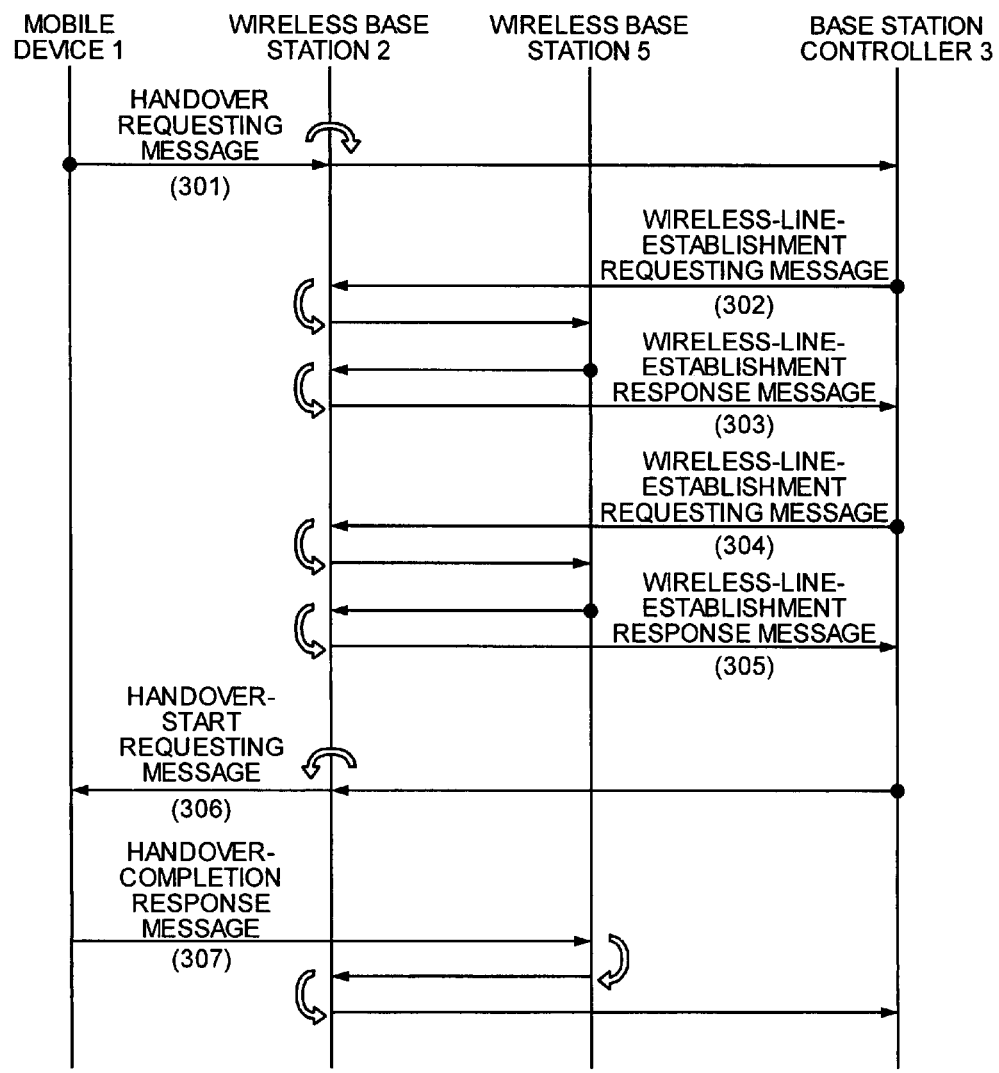
FIG. 13 is a sequence diagram for explaining an operation of a handover in a mobile communication system according to a third embodiment of the present invention (third embodiment)
Figure 14:
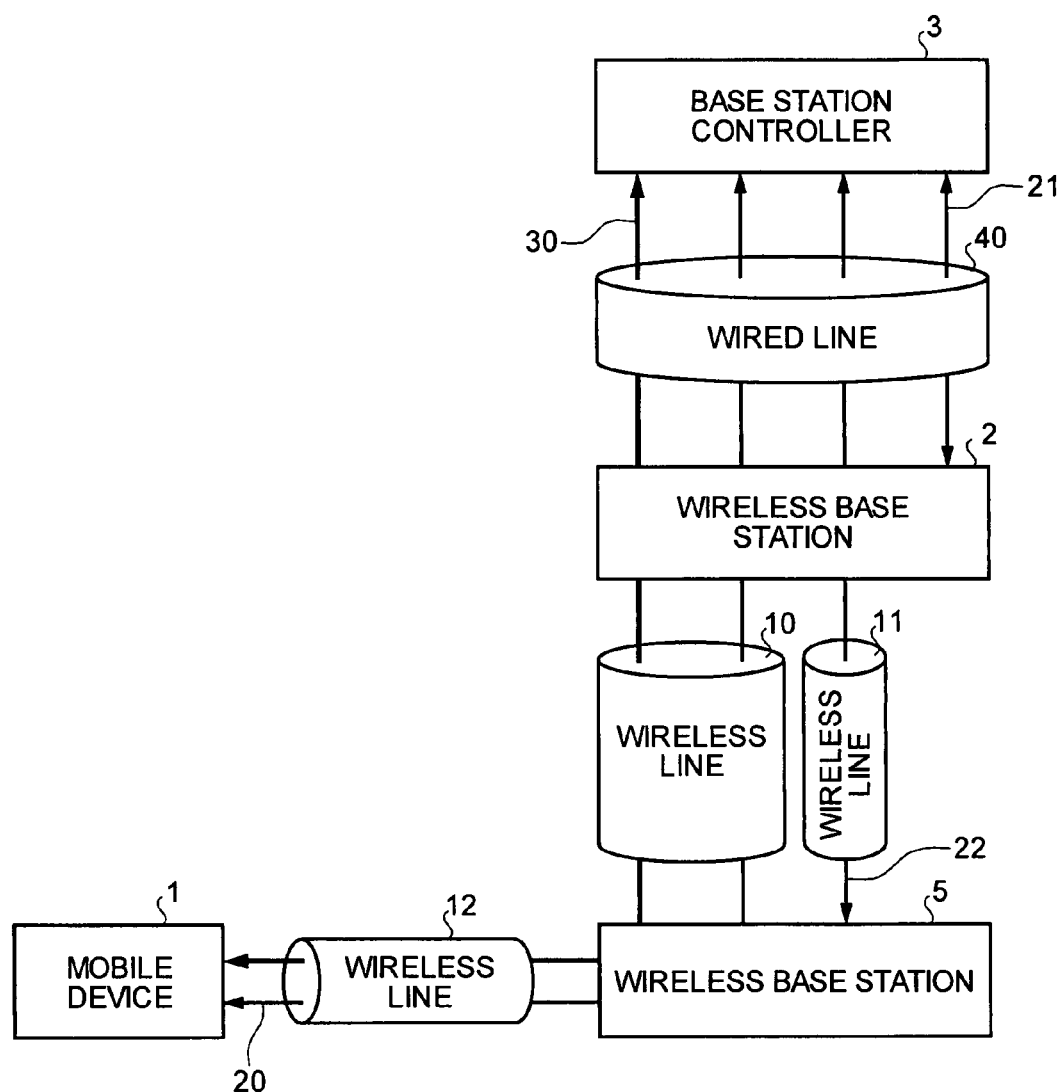
FIG. 14 is an example of a state of signal paths when a mobile device is connected to a wireless base station connected to the base station controller via another wireless base station for communication (third embodiment).

A third embodiment of the present invention is explained referring to FIGS. 13 and 14. The mobile communication system that uses the handover method according to the third embodiment is same or similar to the mobile communication system shown in FIG. 1, and the explanation thereof is omitted here.

Referring to a sequence diagram shown in FIG. 13 and a schematic of a state of signal paths when the mobile device 1 is connected to the wireless base station 5 for communication shown in FIG. 14, an operation of the mobile communication system according to the third embodiment is explained based on an example of the state of the signal paths shown in FIG. 14 when the mobile device 1, which is currently connected to the wireless base station 2 for communication under the state of the signal paths as shown in FIG. 3, is handed over to the wireless base station 5.

The mobile device 1 measures the communication quality of the wireless line 10 and that of the wireless line connected to a wireless base station except the wireless base station 2 (in this case, the wireless line 12 connected to the wireless base station 5). If the communication quality of the wireless line 12 is higher than that of the wireless line 10, the mobile device 1 uses the control signal path 20 to send a handover requesting message to request a handover from the wireless base station 2 to the wireless base station 5 to the base station controller 3 via the wireless-base station 2 (301).

The base station controller 3 recognizes from the handover requesting message that a destination is the wireless base station 5, and uses the control signal path 21 to send a wireless-line-establishment requesting message to the wireless base station 5 via the wireless base station 2 to request that the wireless line 10 currently used between the mobile device 1 and the wireless base station 2 is used between the wireless base station 2 and the wireless base station 5 (302).

After the process for establishing the wireless line 10 between the wireless base station 5 and the wireless base station 2 is completed based on the wireless-line-establishment requesting message, the wireless base station 5 uses the control signal path 21 to send a wireless-line-establishment response message indicative of completion of the process for establishing the wireless line 10 to the base station controller 3 via the wireless base station 2 (303).

The base station controller 3 uses the control signal path 22 to send a wireless-line-establishment requesting message to request the establishment of the wireless line 12 connected to the mobile device 1 to the wireless base station 5 via the wireless base station 2 (304).

After the process for establishing the wireless line 12 connected to the mobile device 1 is completed based on the wireless-line-establishment requesting message, the wireless base station 5 uses the control signal path 22 to send a wireless-line-establishment response message indicative of completion of the process for establishing the wireless line 12 to the base station controller 3 via the wireless base station 2 (305). The wireless base station 5 associates the wireless line 10 established between the wireless base station 5 and wireless base station 2 with the wireless line 12 established between the wireless base station 5 and the mobile device 1, i.e., stores therein the fact that data received from the wireless line 10 should be sent to the wireless line 12 and data received from the wireless line 12 should be sent to the wireless line 10.

The base station controller 3 uses the control signal path 20 to send a handover-start requesting message that permits a handover to the mobile device 1 via the wireless base station 2 (306).

Upon receiving the handover-start requesting message, the mobile device 1 starts transition from the wireless line 10 connected to the wireless base station 2 to the wireless line 12 connected to the wireless base station 5. After the transition to the wireless line 12 is completed (after the wireless line 12 is established), the mobile device 1 uses the control signal path 20 to send a handover-completion response message indicative of establishment of the wireless line 12 to the base-station controller 3 via the wireless base station 5 and the wireless base station 2 (307).

As explained above, according to the third embodiment, the wireless line 11 is established in advance between the wireless base station 2 connected to the base station controller 3 with the wired line 40 and the wireless base station 5 connected to the base station controller 3 not with the wired line 40, and the wireless line 10 that was used between the wireless base station 2 and the mobile device 1 is established between the wireless base station 2 and the wireless base station 5 when the mobile device 1 is handed over from the wireless base station 2 to the wireless base station 5. Between the wireless base station 2 and the wireless base station 5, the control message for the base station controller 3 to control the wireless base station 5 is transmitted using the wireless line 11, and the control message for the base station controller 3 to control the mobile device 1 and the user data of the mobile device 1 and the counterpart are transmitted using the wireless line 10. As a result, the processing load on the base station controller 3 is reduced, and the handover can be performed with the wireless base station 5 that includes only the wireless interface having no restriction on the location thereof.

Moreover, the wireless line 10 that was used between the mobile device 1 and the wireless base station 2 is used for transmission of the control message for the base station controller 3 to control the mobile device 1 between the wireless base station 2 and the wireless base station 5. As a result, the wireless base station 2 does not need to establish a new wireless line, and thereby the size of sequence in the handover process is reduced.

INDUSTRIAL APPLICABILITY

As described above, the handover method in the wireless access network according to an aspect of the present invention is advantageous to a wireless access network in which a base station controller comprehensively controls wireless base stations in the network to hand over a mobile device, and especially suitable for a wireless access network including a wireless base station that includes only a wireless interface and cannot be directly connected to the wireless base station controller using a wired line.

The invention claimed is:

1. A handover method in a wireless access network that includes a base station controller, at least one first wireless base station connected to the base station controller with a wired line, and at least one second wireless base station not connected to the base station controller with the wired line, a mobile device being connected to the base station controller via the first wireless base station or the second wireless base station, the handover method comprising:
   establishing a wireless line between the first wireless base station and the second wireless base station;
   sending including, when the mobile device performs a handover from the first wireless base station to the second wireless base station, the base station controller sending a control message addressed to the second base station to notify that the mobile device performs the handover, to the first wireless base station via the wired line;
   sending including the first wireless base station sending the control message addressed to the second wireless base station received from the base station controller to the second wireless base station using established wireless line; and
   exchanging including the first wireless base station and the second wireless base station exchanging a control message for the base station controller to control the second wireless base station, a control message for the base station controller to control the mobile device, and user data of the mobile device and a communication partner, using the wireless line, wherein at least a wireless line including the wireless line is dynamically set for communicating a control signal and the user data between the first wireless base station and the second wireless base station.

2. The handover method in the wireless access network according to claim 1, wherein
   the wireless line is a single wireless line, and
   the exchanging includes the first wireless base station and the second wireless base station exchanging the control message for the base station controller to control the second wireless base station, the control message for the base station controller to control the mobile device, and the user data of the mobile device and the communication partner, using same wireless line.

3. The handover method in the wireless access network according to claim 1, wherein
   the wireless line includes a first wireless line and a second wireless line, and
   the exchanging includes
      the first wireless base station and the second wireless base station exchanging the control message for the base station controller to control the second wireless base station, using the first wireless line, and
      the first wireless base station and the second wireless base station exchanging the control message for the base station controller to control the mobile device, and the user data of the mobile device and the communication partner, using the second wireless line.

4. The handover method in the wireless access network according to claim 1, wherein
   the wireless line is a first wireless line,
   the handover method further comprises establishing including the second wireless base station establishing a second wireless line between the second wireless base station and the first wireless base station, upon receiving the control message to notify that the mobile device performs the handover, and
   the exchanging includes
      the first wireless base station and the second wireless base station exchanging the control message for the base station controller to control the second wireless base station and the control message for the base station controller to control the mobile device, using the first wireless line, and
      the first wireless base station and the second wireless base station exchanging the user data of the mobile device and the communication partner, using the second wireless line.

5. The handover method in the wireless access network according to claim 1, wherein
   the wireless line is a first wireless line,
   the handover method further comprises establishing including the second wireless base station establishing a second wireless line and a third wireless line between the second wireless base station and the first wireless base station, upon receiving the control message to notify that the mobile device performs the handover, and
   the exchanging includes
      the first wireless base station and the second wireless base station exchanging the control message for the base station controller to control the second wireless base station, using the first wireless line,
      the first wireless base station and the second wireless base station exchanging the control message for the base station controller to control the mobile device, using the second wireless line, and
      the first wireless base station and the second wireless base station exchanging the user data of the mobile device and the communication partner, using the third wireless line.

6. The handover method in the wireless access network according to claim 1, wherein
   the wireless line is a single wireless line,
   the handover method further comprises establishing including the second wireless base station establishing a wireless line that was being used by the mobile device between the mobile device and the first wireless base station between the second wireless base station and the first wireless base station, upon receiving the control message to notify that the mobile device performs the handover, and
   the exchanging includes
      the first wireless base station and the second wireless base station exchanging the control message for the base station controller to control the second wireless base station, using the wireless line established in advance, and the first wireless base station and the second wireless base station exchanging the control message for the base station controller to control the mobile device and the user data of the mobile device and the communication partner, using the wireless line that was being used between the mobile device and the first wireless base station before the handover.

7. A wireless access network for supporting handover, the wireless access network comprising:

a base station controller;

at least one first wireless base station connected to the base station controller with a wired line;

at least one second wireless base station not connected to the base station with the wired line;

a mobile device being connected to the base station controller via the first wireless base station or the second wireless base station; the mobile device being configured to perform a handover from the first wireless base station to the second wireless base station; and a wireless line that establishes connection between the first wireless base station and the second wireless base station;

wherein when the mobile device performs the handover from the first wireless base station to the second wireless base station, the base station controller sends a control message addressed to the second base station to notify that the mobile device performs the handover, to the first wireless base station via the wired line;

wherein the first wireless base station sends the control message addressed to the second wireless base station received from the base station controller to the second wireless base station using said established wireless line; and wherein the first wireless base station and the second wireless base station exchange a control message for the base station controller to control the second wireless base station, a control message for the base station controller to control the mobile device, and user data of the mobile device and a communication partner, using the wireless line, wherein at least a wireless line including the wireless line is dynamically set for communicating a control signal and the user data between the first wireless base station and the second wireless base station.

8. The wireless access network according to claim 7, wherein the wireless line is a single wireless line, and the first wireless base station and the second wireless base station are configured to exchange the control message for the base station controller to control the second wireless base station, the control message for the base station controller to control the mobile device, and the user data of the mobile device and the communication partner, using same wireless line.

9. The wireless access network according to claim 7, wherein the wireless line includes a first wireless line and a second wireless line, and the first wireless base station and the second wireless base station are configured to exchange the control message for the base station controller to control the second wireless base station, using the first wireless line, and the first wireless base station and the second wireless base station are further configured to exchange the control message for the base station controller to control the mobile device, and the user data of the mobile device and the communication partner, using the second wireless line.

10. The wireless access network according to claim 7, wherein the wireless line is a first wireless line, the second wireless base station is configured to establish a second wireless line between the second wireless base station and the first wireless base station, upon receiving the control message to notify that the mobile device performs the handover, and the first wireless base station and the second wireless base station are configured to exchange the control message for the base station controller to control the second wireless base station and the control message for the base station controller to control the mobile device, using the first wireless line, and wherein the first wireless base station and the second wireless base station are further configured to exchange the user data of the mobile device and the communication partner, using the second wireless line.

11. The wireless access network according to claim 7, wherein the wireless line is a first wireless line, wherein the second wireless base station establishes a second wireless line and a third wireless line between the second wireless base station and the first wireless base station, upon receiving the control message to notify that the mobile device performs the handover, and wherein the first wireless base station and the second wireless base station exchange the control message for the base station controller to control the second wireless base station, using the first wireless line, wherein the first wireless base station and the second wireless base station exchange the control message for the base station controller to control the mobile device, using the second wireless line, and wherein the first wireless base station and the second wireless base station exchange the user data of the mobile device and the communication partner, using the third wireless line.

12. The wireless access network according to claim 7, wherein the wireless line is a single wireless line, the second wireless base station establishes a wireless line that was being used by the mobile device between the mobile device and the first wireless base station between the second wireless base station and the first wireless base station, upon receiving the control message to notify that the mobile device performs the handover, and the first wireless base station and the second wireless base station exchange the control message for the base station controller to control the second wireless base station, using the wireless line established in advance, and the first wireless base station and the second wireless base station exchange the control message for the base station controller to control the mobile device and the user data of the mobile device and the communication partner, using the wireless line that was being used between the mobile device and the first wireless base station before the handover.

* * * * *